United States Patent
Ji et al.

(10) Patent No.: US 9,740,430 B2
(45) Date of Patent: Aug. 22, 2017

(54) OPTIMIZING PARALLEL BUILD OF APPLICATION

(71) Applicant: International Business Machines Corporation, Armonk, NY (US)

(72) Inventors: Jin Song Ji, Shanghai (CN); Jian Jiang, Shanghai (CN); Si Yuan Zhang, Shanghai (CN); Hong Wei Zhu, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 24 days.

(21) Appl. No.: 14/028,753

(22) Filed: Sep. 17, 2013

(65) Prior Publication Data

US 2014/0089530 A1    Mar. 27, 2014

(30) Foreign Application Priority Data

Sep. 21, 2012 (CN) .......................... 2012 1 0356575

(51) Int. Cl.
G06F 9/44 (2006.01)
G06F 3/00 (2006.01)
G06F 3/06 (2006.01)
G06F 9/45 (2006.01)

(52) U.S. Cl.
CPC ............ G06F 3/0659 (2013.01); G06F 8/456 (2013.01)

(58) Field of Classification Search
None
See application file for complete search history.

(56) References Cited

U.S. PATENT DOCUMENTS

| 6,059,842 | A | 5/2000 | Dumarot et al. |
| 7,003,759 | B2 | 2/2006 | Jameson |
| 7,051,092 | B2 * | 5/2006 | Lenz et al. .................... 709/221 |
| 7,395,529 | B1 | 7/2008 | Stanton et al. |
| 7,539,976 | B1 | 5/2009 | Ousterhout et al. |
| 8,037,453 | B1 | 10/2011 | Zawadzki |
| 2007/0136718 | A1 | 6/2007 | Mockford |
| 2009/0222596 | A1* | 9/2009 | Flynn ...................... G06F 3/061 710/22 |
| 2010/0262948 | A1* | 10/2010 | Melski et al. ................ 717/101 |

FOREIGN PATENT DOCUMENTS

| CN | 1221146 A | 6/1999 |
| WO | 2004088510 A2 | 10/2004 |

OTHER PUBLICATIONS

"Method of preventing build failures by searching through levels in a multi-level revision control system," [Online] IPCOM, Disclosure No. IPCOM000179779D, Feb. 25, 2009 [retrieved Aug. 2, 2013], retrieved from the Internet: <http://ip.com/IPCOM/000179779>, 1 pg.

* cited by examiner

Primary Examiner — Hyun Nam
(74) Attorney, Agent, or Firm — Cuenot, Forsythe & Kim, LLC (57) ABSTRACT

Optimizing a parallel build of an application includes, in parallel execution of commands, recording command sequence numbers and access information of the commands and detecting an execution conflict based on the command sequence numbers and the access information of the commands using a processor. Commands involved in the execution conflict are re-executed serially.

20 Claims, 8 Drawing Sheets

OPTIMIZING PARALLEL BUILD OF APPLICATION

CROSS-REFERENCE TO RELATED APPLICATIONS

This application claims the benefit of China Application Number 201210356575.8 filed on Sep. 21, 2012, which is fully incorporated herein by reference.

BACKGROUND

Nowadays, applications can be found ubiquitously, from calculator programs on computers to stock transaction systems. In the ordinary development of the computer programs, however, build plays an important role. Build refers to the complete process of parsing source codes and producing object codes and binary codes with a compiler. In the build of a large application (such as an ordinary driver), developers have to wait a period of time, perhaps, several hours or even days.

At present, it is common for developers to shorten build time by using parallel build techniques. For instance, gmake is a kind of program compiler tool from Linux, which is used with makefiles for program compiling. A makefile is a build file in a shared file system, an underlying file of an application, which is present along with the application after writing of the application. An execution sequence of various commands of the application is stored in the makefile. Taking gmake −4 as an example, gmake −4 can fetch 4 commands simultaneously to execute them in parallel. For example, gmake fetches 4 commands according to a command execution sequence in makefile and then executes in parallel, when commands are finished executing in a branch, a next command is fetched to execute on that branch, so that build efficiency can be improved.

However, there are some issues in parallel builds. For example, no problems may occur in serial build of an application, while its parallel build may be unsuccessful. A reason of such a problem is that, for example, some commands read/write on one and the same file, with an unapparent reading/writing relationship between the two files. Therefore, it is difficult for gmake to recognize such a condition when commands are fetched according to the command sequence in the makefile, leading to the parallel execution of a previous command and a command depending on the reading/writing on a certain file of the previous command, even execution of the command before the previous command. When such a problem occurs, it is very difficult to trace. Developers typically have to spend a long period of time to investigate and eliminate such a problem.

In order to trace and debug sources for errors that occur in parallel builds, in the prior art, error trace and debug tools have been developed for parallel build tools from different manufactures. These tools, however, do not have generality. Further, some of the tools cannot completely eliminate errors caused by command disorder execution.

BRIEF SUMMARY

A method for optimizing a parallel build of an application includes, in parallel execution of commands, recording command sequence numbers and access information of the commands, detecting an execution conflict based on the command sequence numbers and the access information of the commands using a processor, and re-executing commands involved in the execution conflict serially.

A system for optimizing a parallel build of an application includes a processor programmed to initiate executable operations. The executable operations include, in parallel execution of commands, recording command sequence numbers and access information of the commands, detecting an execution conflict based on the command sequence numbers and the access information of the commands, and re-executing commands involved in the execution conflict serially.

A computer program product for optimizing a parallel build of an application includes a computer readable storage medium having program code stored thereon. The program code is executable by a processor to perform a method. The method includes, in parallel execution of commands, recording command sequence numbers and access information of the commands using the processor, detecting an execution conflict based on the command sequence numbers and the access information of the commands using the processor, and re-executing commands involved in the execution conflict serially using the processor.

BRIEF DESCRIPTION OF THE SEVERAL VIEWS OF THE DRAWINGS

Through the more detailed description of some embodiments of the present disclosure with the accompanying drawings, various objects, features and advantages of the present disclosure will become more apparent, wherein the same reference generally refers to the same components in the embodiments of the present disclosure.

DETAILED DESCRIPTION

One or more embodiments of the present invention relate to compiling a computer application, and more specifically, to a method and system for optimizing parallel builds of an application, a compiling system and a computer system utilizing the same.

A problem to be addressed by the embodiments of the present invention is to reduce errors caused by disorder execution of commands with a read/write relationship on the same file in a parallel build of commands.

According to an aspect of the present invention, a method for optimizing a parallel build of an application is provided, including: in parallel execution of commands, recording command sequence numbers and access information of the commands; detecting an execution conflict based on the command sequence numbers and the access information of the commands; and re-executing commands involved in the execution conflict.

According to another aspect of the present invention, a system for optimizing a parallel build of an application is provided, including: recording means configured to record command sequence numbers and access information of the commands in parallel execution of commands; detecting means configured to detect an execution conflict based on the command sequence numbers and the access information of the commands; and re-executing means configured to re-execute commands involved in the execution conflict.

According to another aspect of the present invention, a compiling system is provided, including: a compiler configured to compile an application; and optimizing device configured to optimize the compiling of the compiler using the above system.

According to another aspect of the present invention, a computer system is provided, including: a shared file system configured to build an application in parallel; and the above compiling system.

One beneficial effect of the embodiments of the present invention is that the solution of parallel build optimization is applicable to build tools from various manufactures, and thus is for general purpose in nature.

Another beneficial effect of the embodiments of the present invention is that since command execution conflicts are detected based on information acquired by a file system in executing commands, the detection has a very high success rate.

Yet another beneficial effect of the present invention is that no additional trace and debug is required for developers, leading to lower maintenance cost and a higher degree of convenience.

The embodiments of the present invention are completely transparent to users.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and to completely convey the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
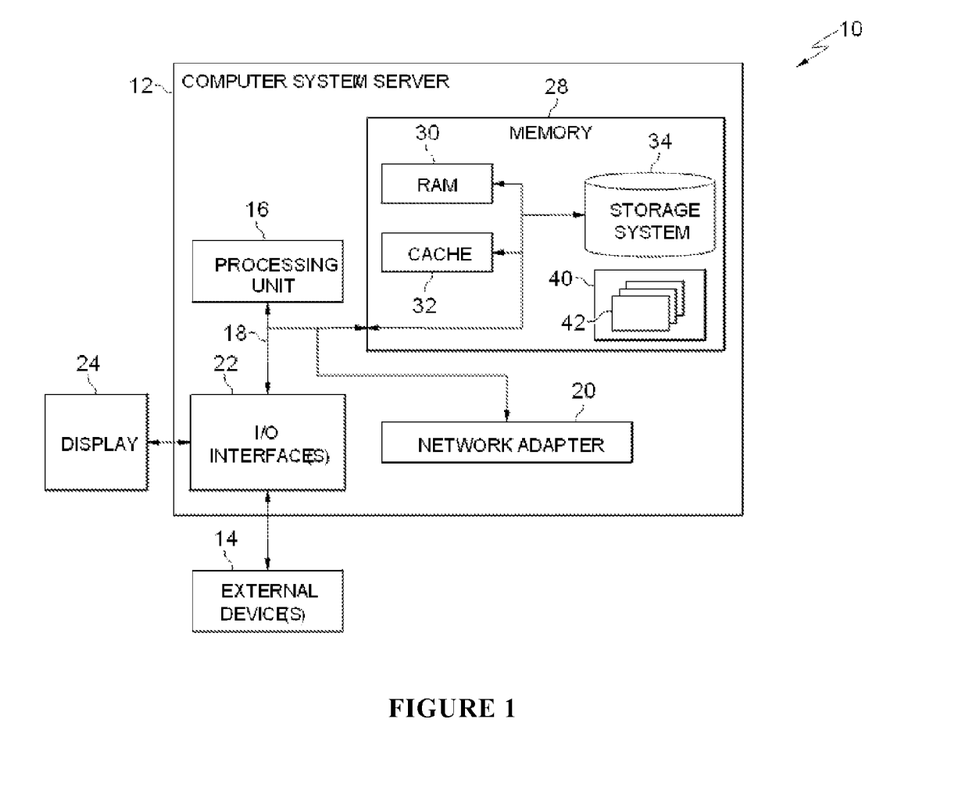
FIG. 1 shows a block diagram of an exemplary computer system/server which is applicable to implement embodiments of the present invention.

FIG. 1 shows a block diagram of an exemplary computer system/server 12 suitable for implementing embodiments of the present invention. The exemplary computer system/server 12 of FIG. 1 is only one example and is not intended to limit the scope of use or functionality of embodiments of the invention described herein in any aspect.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
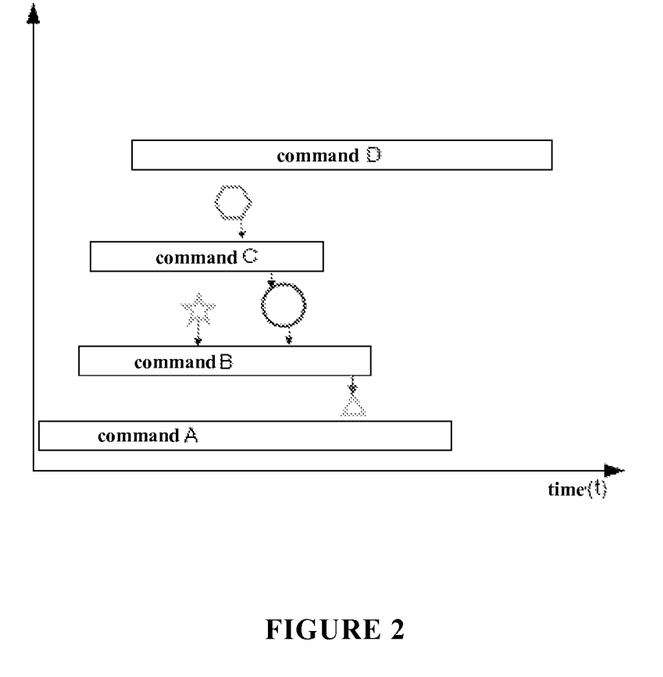
FIG. 2 shows problems present in parallel builds in the prior art.

The inventors of the present invention have found that errors usually occur in a parallel build due to dependencies among some commands in commands to be executed in parallel, reuse of temporary files, resource exhaustion, serial tools, etc. FIG. 2 shows problems present in a parallel build in the prior art. For example, among commands A, B, C, and D that execute in parallel, C and B perform a reading operation and a writing operation on the same file. If the reading operation is required to be executed after the writing operation, while in the parallel execution, the reading operation takes place before or concurrently the writing operation, an error may occur in this parallel execution. Such an error is unpredictable for developers, and is difficult to trace and debug. In order to overcome these problems in the prior art, it is conceived by the inventors to detect those commands having mismatching between command execution sequence and dependencies therebetween in commands executed in parallel, and then execute these commands again in serial. Since dependencies (for example, reading from/writing to the same file) among commands are not necessarily reflected in the makefile, they cannot be detected easily without practical execution. Thus, commands are executed in the present invention, during which file access information of the commands is recorded at the same time, based on which file access conflicts are detected for those commands, and then commands involved in a conflict are re-executed in serial according to dependencies therebetween. Furthermore, other commands having no dependencies can execute in parallel or in serial with the above sequential execution concurrently.

Figure 3:
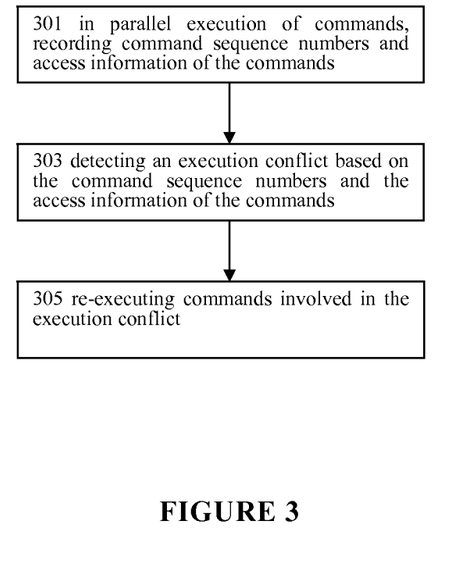
FIG. 3 shows a flowchart of a method for optimizing a parallel build of an application according to an embodiment of the present invention.

FIG. 3 shows a flowchart of a method for optimizing a parallel build of an application in accordance with an embodiment of the present invention. For any application, developers have to write codes, compile program codes into binary executable files with compiler tools (such as, make and gmake from Linux, GCC from Solaris). Only during the particular compiling process, the system can recognize which type of access (reading operation or writing operation) is performed on which file. For instance, in the execution of a command such as ptr=localtime (<), it executes the localtime function through a pointer, only in the particular compiling process, it can be known which file is accessed by the localtime function, wherein the access is a reading operation. Hence, access information can be obtained for commands only after a round of compiling has been performed on those commands.

Some tools have been provided in the prior art for developers to acquire related information from a file system. A typical example of these tools is the Hook tool from the Windows system. Hook is a special message processing mechanism, capable of monitoring various event messages in the system or process, and capturing messages directed to a target window to process. All information required in the present invention is contained in Windows event messages.

The method for optimizing parallel build of an application as shown in FIG. 3 includes the following steps. At step 301, command sequence numbers and access information of commands are recorded in parallel execution of the commands. At step 303, an execution conflict is detected based on the command sequence numbers and the access information of the commands. At step 305, commands involved in the execution conflict are re-executed.

At step 301, in parallel execution of commands, command sequence numbers and access information of the commands are recorded. Optionally, commands themselves are recorded as well. As known by those skilled in the art, the make tool is usually used in connection with a makefile.

According to an embodiment of the present invention, the make tool can be adopted to assign command sequence numbers to commands in the makefile. These command sequence numbers specify an execution sequence of these commands in serial execution, that is, an invoking sequence of these commands in their correct execution.

For instance, a regular makefile is shown as follows.

```
Makefile1:
sed -i "s/adfd/asdf/" test.h       // write to test.h
gcc "#include "test.h into test.c" " -o test2    //read test.h into the
                                //beginning of test.c and compile test.c into test.o
```

In an embodiment of the present invention, the above file is converted into the following form.

```
Makefile1:
1. sed -i "s/adfd/asdf/" test.h       // write to test.h
2. gcc "#include "test.h into test.c" " -o test2    //read test.h into the
                                // beginning of test.c and compile test.c into test.o
```

In the parallel execution, messages issued by a file system for executing commands can be captured with a tool such as Hook described above, so that command sequence numbers and access information of the commands can be obtained.

For example, as to the above Makefile, there are two commands that will be executed in parallel. Command sequence numbers, such as 1, 2 respectively, represent a sequence of commands, by which they are dispatched to a processor to execute. Command contents are "sed -i "s/adfd/asdf/" test.h" and "gcc "#include "test.h into test.c" "-o test2", respectively. The above is merely an example, and command sequence numbers may have other values.

Access information of commands includes an access timestamp, an accessed file ID, and an access type. They are recorded in a way corresponding to a command sequence number. Access timestamps of commands are timings when those commands are executed. Although in parallel execution, some commands are fetched according to a sequence and executed concurrently, their file access timings are not necessarily the same, resulting in such a disordered condition that although a command having an anterior command sequence number and an command having a posterior command sequence number are fetched out concurrently, the command having a posterior command sequence number accesses a file before the other. For example, as to the command "sed -i "s/adfd/asdf/" test.h", its practical execution timing may be 12:01:23:26.

The accessed file ID is the ID of a file the command directs to. Such as, for the command "sed -i "s/adfd/asdf/" test.h", it operates on a file test.h, which may have been assigned with an ID: ID1345678432 by the system.

The command access type specifies whether an operation executed by a command is a reading or writing operation.

From above, it can be known that, for example, information acquired at step 301 can be recorded as follows (if the command itself is recorded as well).

1. sed -i "s/adfd/asdf/" test.h, 12:01:23:26, 1D1345678432, W
2. gcc "#include "test.h into test.c"" -o test2, 12:01:23:24, 1D1345678432, R At step 303, execution conflicts are detected based on the command sequence numbers and the access information of the commands. As described previously, command execution conflicts are generally caused by disorder occurring in execution sequence of commands having dependencies therebetween.

Figure 4:
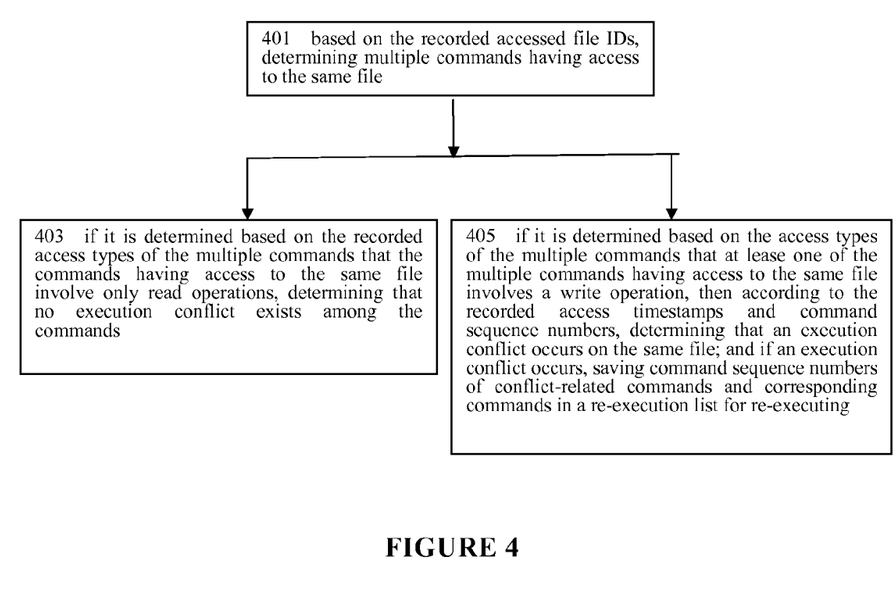
FIG. 4 shows a flowchart of a process for detecting command execution conflicts according to an embodiment of the present invention.

FIG. 4 shows a flowchart of a process for detecting command execution conflicts according to an embodiment of the present invention.

At step 401, according to accessed file IDs in the recorded access information, multiple commands having access to the same file are determined. Those skilled in the art should appreciate that if different reading and writing operations are directed to different files, they have no dependencies therebetween. Often, command execution sequence can be determined only when the program is executed. Although directed graphs are used in the prior art to represent different dependencies of various sentences within a program, it is far inadequate for detection of command execution conflicts.

This embodiment utilizes information acquired during the execution of commands to detect dependencies. Taking Makefile1 as an example again, it can be known from the file ID that commands 1, 2 have operations on a file with an ID: 1D1345678432. Thus, commands 1, 2 may have a dependency therebetween.

At step 403, if it is determined according to the recorded access types of the multiple commands that those commands having access to the same file only involve reading operations, it can be determined that no command execution conflict exists. This is because reading operations have no dependencies therebetween. Only reading-writing operations or writing-writing operations may lead to different results from different operation sequences, and consequently, results of these operations depend on their execution sequences. Also, taking Makefile1 as an example again, according to the access types, it can be known that commands 1, 2 include reading and writing operations. Thereby, it is determined that commands 1, 2 may have a dependency therebetween.

At step 405, based on the recorded access types of the multiple commands, if it is determined that at least one of the multiple commands having access to the same file involves a writing operation; according to the recorded access timestamps and command sequence numbers, it is determined that an execution conflict occurs on the same file. If an execution conflict occurs, command sequence numbers of conflict-related commands and corresponding commands are saved in a re-execution list for re-executing.

Also, taking Makefile1 as an example, it can be known from the access timestamps, commands 1, 2 access the same file in the following sequence.

2. gcc test.c -o test.o
1. gcc "#include "test.h into test.c"" -o test2

For example, through comparing the file access sequence (2, 1) and the file access sequence (1, 2), a command execution sequence error is determined, that is, an command execution conflict occurs.

Also, taking Makefile1 as an example, it is determined that commands 1, 2 are saved in the re-execution list as follows, for example.

re-execute list:
1. sed -i "s/adfd/asdf/" test.h
2. gcc "#include "test.h into test.c"" -o test2

If commands themselves are recorded during parallel execution of the commands, recorded commands are directly saved in the re-execution list. If not, corresponding commands have to be retrieved from the application according to their command sequence numbers and then saved into the re-execution list.

At step 305, those commands involved in the conflict are executed once again. Sentences in the re-execution list are submitted to the compiler in order for serial execution, after which its execution result is submitted to the shared file system. In doing so, it is guaranteed to execute sentences in conflict according to dependencies among the commands, and such no errors will arise.

When various commands execute according to the re-execution list, other commands except for those related to the execution conflict execute at the same time. For example, commands 1, 2 can be made to execute in parallel with other commands. Alternatively, other commands except for those related to the execution conflict may execute after the execution of various commands according to the re-execution list. For example, after the execution of commands 1, 2, their subsequent commands may execute.

Furthermore, commands in the re-execution list can be scheduled with a scheduling algorithm to further optimize execution efficiency. The scoreboard algorithm is one of typical re-scheduling algorithms in the prior art. The matter is simple for reading/writing operations on a single file, however, if reading/writing operations on multiple files and having more complicated dependencies therebetween are involved (such as, command 1 writes to file 1, command 2 reads from file 1 and writes to file 2, and command 1 reads from file 2), using a re-scheduling algorithm may further improve processing efficiency. Files are simulated as resources in the scoreboard algorithm, that is, only one operation can be performed on a single file at a certain time, but not two concurrent operations. This guarantees that a next operation is performed on a file only after a previous operation on the file is complete.

Figure 5:
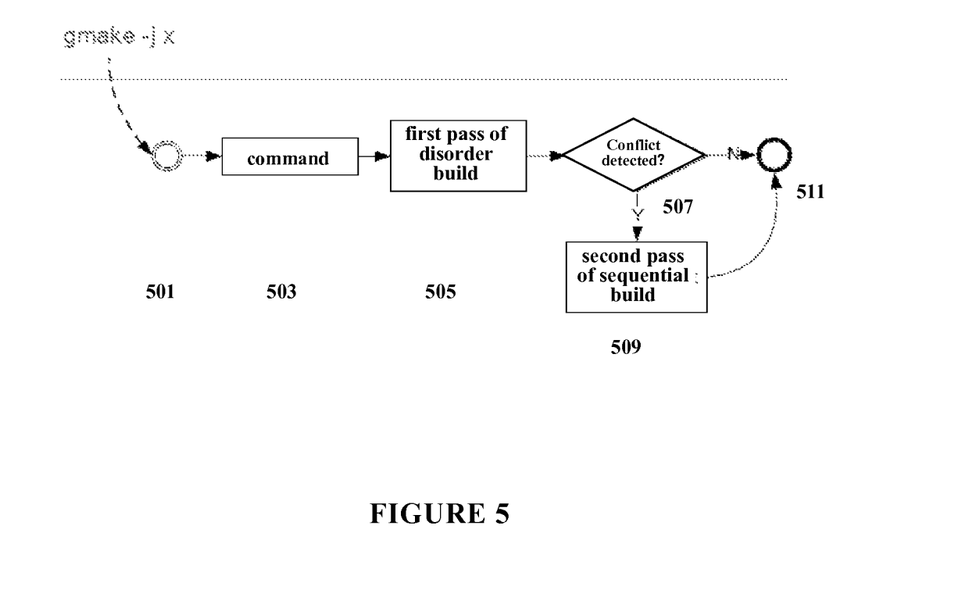
FIG. 5 shows a timing diagram of optimizing a parallel build of an application according to an embodiment of the present invention.

FIG. 5 is a timing diagram showing the process for optimizing parallel build of an application according to an embodiment of the present invention.

At step 501, program codes are parsed by a compiler to prepare for compiling.

At step 503, commands are dispatched.

At step 505, commands are executed according to the conventional manner.

At step 507, conflicts are detected according to data collected during the conventional execution.

At step 509, commands related to a conflict execute in serial according to their dependencies.

At step 511, results are submitted.

The method for optimizing parallel build of an application has been described above, under the same inventive concept, a system for optimizing parallel build of an application will be described with reference to FIG. 6 below, in which the same or corresponding particular details have been completely described previously, and thus will not be repeated herein.

Figure 6:
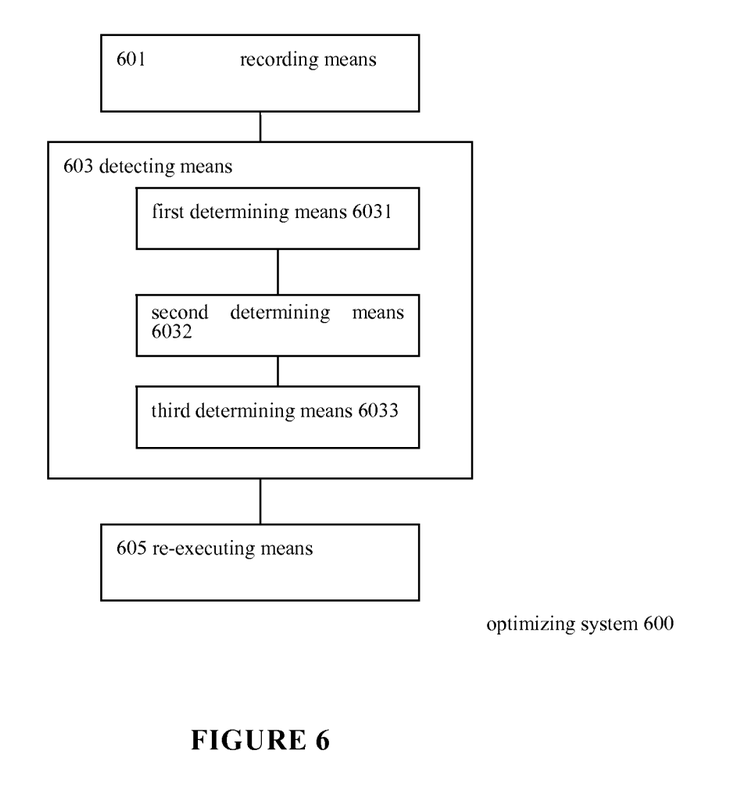
FIG. 6 shows a block diagram of a system for optimizing a parallel build of an application according to an embodiment of the present invention.

FIG. 6 shows a block diagram of a system 600 for optimizing a parallel build of an application according to an embodiment of the present invention. As shown in FIG. 6, the optimizing system 600 includes recording means 601 configured to record command sequence numbers and access information of the commands in parallel execution of commands; detecting means 603 configured to detect an execution conflict based on the command sequence numbers and the access information of the commands; and re-executing means 605 configured to re-execute commands involved in the execution conflict.

According to an embodiment of the present invention, the optimizing system 600 further includes allocating means (not shown), configured to allocate command sequence numbers to commands according to a makefile in a shared file system. Optionally, the recording means 601 further records commands themselves.

According to an embodiment of the present invention, the access information of the commands includes an access timestamp, an accessed file ID, and an access type.

According to an embodiment of the present invention, the detecting means 603 includes: first determining means 6031 configured to, based on the recorded accessed file IDs, determine multiple commands having access to the same file; and second determining means 6032 configured to determine that no execution conflict exists among the commands if it is determined based on the recorded access types of the multiple commands that the commands having access to the same file involve only read operations; and third determining means 6033 configured to, if it is determined based on the access types of the multiple commands that at least one of the multiple commands having access to the same file involves a write operation, then according to the recorded access timestamps and command sequence numbers, determine that an execution conflict occurs on the same file; and if an execution conflict occurs, save command sequence numbers of conflict-related commands and corresponding commands in a re-execution list for re-executing.

According to an embodiment of the present invention, if the sequence of the command sequence numbers is inconsistent with the sequence of the access timestamps, a conflict is determined to occur.

According to an embodiment of the present invention, the means for re-executing 605 includes: acquiring means (not shown) configured to perform a scoreboard algorithm on commands in the re-execution list to obtain a sequential chain to be executed; and ensuring means (not shown) configured to ensure that a next command in the sequential chain begins to execute only after its previous command is completed, according to the sequential chain to be executed.

According to an embodiment of the present invention, when the commands related to the execution conflict execute according to the sequential chain to be executed, other commands than the commands related to the execution conflict execute at the same time.

According to an embodiment of the present invention, after the commands related to the execution conflict execute according to the sequential chain to be executed, other commands than the commands related to the execution conflict execute.

Figure 7:
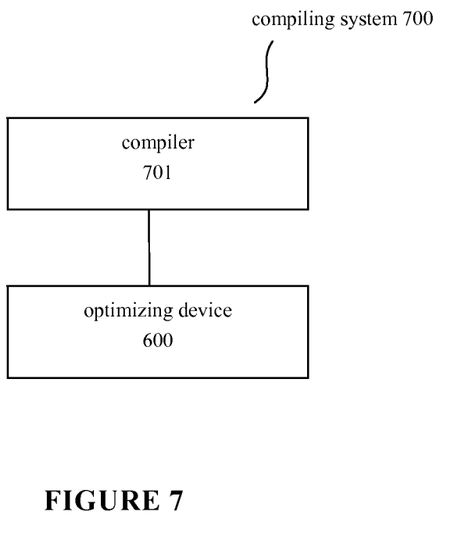
FIG. 7 shows a block diagram of a compiling system according to an embodiment the present invention.

FIG. 7 shows a block diagram of a compiling system 700 according to another embodiment of the present invention. As shown in FIG. 7, the compiling system 700 includes: a compiler 701, configured to compile an application; and an optimizing device 703, configured to optimize the compiling of the compiler with the optimizing system according to the present invention, as shown in FIG. 6.

Figure 8:
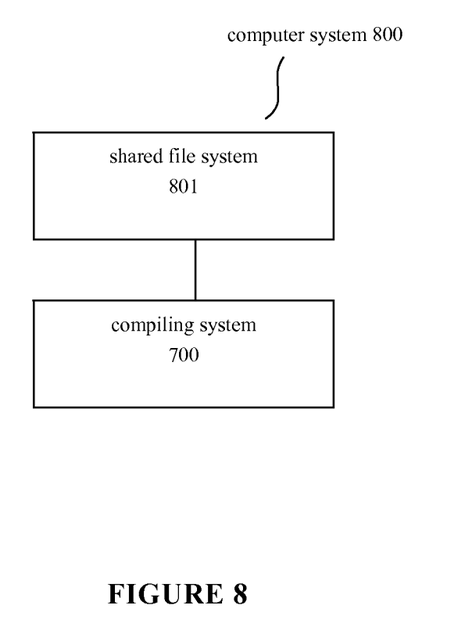
FIG. 8 shows a block diagram of a computer system according to an embodiment of the present invention.

FIG. 8 shows a block diagram of a computer system 800 according to the present invention. As shown in FIG. 8, the computer system 800 includes: a shared file system 801, configured to build an application in parallel; and a compiling system 803 as shown in FIG. 7.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function (s). It should also be noted that, in some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing a parallel build of an application having commands including a first command and a second command, comprising:
   recording, during parallel execution of the first and second commands and after compiling of the first and second commands,
     a first command sequence number of the first command,
     a second command sequence number of the second command,
     first access information of the first command, and
     second access information of the second command;
   identifying, from the first and second command sequence numbers, an invoking sequence of the first command and the second command;
   detecting, based upon the first and second access information, an execution conflict between the first command and the second command; and
   saving, in a re-execution list and based upon the execution conflict, the first and second commands, wherein
   the command sequence numbers specify an execution sequence of the commands in serial execution.

2. The method of claim 1, wherein
   the command sequence numbers are stored within a makefile.

3. The method of claim 1, wherein
   the access information for a particular command includes an access type, and
   the conflict is detected based upon the access type for the particular command being a write operation.

4. The method of claim 1, wherein
   the first and second access information respectively include first and second access timestamps, and
   the conflict is detected based the execution sequence being inconsistent with a time sequence of the first and second access timestamps.

5. The method of claim 1, wherein
   the access information for a particular command includes an accessed file ID, and
   the conflict is detected based upon the first and second access information referring to a same particular access file ID.

6. The method of claim 1, wherein
   the first and second command sequence numbers are also saved in the re-execution list.

7. The method of claim 1, wherein
   commands saved within the re-execution list are re-executed.

8. A computer hardware system configured to optimize a parallel build of an application having commands including a first command and a second command, comprising:
   a hardware processor programmed to initiate the following executable operations:
     recording, during parallel execution of the first and second commands and after compiling of the first and second commands,
       a first command sequence number of the first command,
       a second command sequence number of the second command,
       first access information of the first command, and
       second access information of the second command;
     identifying, from the first and second command sequence numbers, an invoking sequence of the first command and the second command;
     detecting, based upon the first and second access information, an execution conflict between the first command and the second command; and
     saving, in a re-execution list and based upon the execution conflict, the first and second commands, wherein
   the command sequence numbers specify an execution sequence of the commands in serial execution.

9. The system of claim 8, wherein
   the command sequence numbers are stored within a makefile.

10. The system of claim 8, wherein
    the access information for a particular command includes an access type, and
    the conflict is detected based upon the access type for the particular command being a write operation.

11. The system of claim 8, wherein
    the first and second access information respectively include first and second access timestamps, and the conflict is detected based the execution sequence being inconsistent with a time sequence of the first and second access timestamps.

12. The system of claim 8, wherein
the access information for a particular command includes an accessed file ID, and
the conflict is detected based upon the first and second access information referring to a same particular access file ID.

13. The system of claim 8, wherein
the first and second command sequence numbers are also saved in the re-execution list.

14. The system of claim 8, wherein
commands saved within the re-execution list are re-executed.

15. A computer program product, comprising:
a computer readable hardware storage device having program code stored therein for optimizing a parallel build of an application having commands including a first command and a second command,
the program code, which when executed by a computer hardware system, causes the computer hardware system to perform:
　recording, during parallel execution of the first and second commands and after compiling of the first and second commands,
　　a first command sequence number of the first command,
　　a second command sequence number of the second command,
　　first access information of the first command, and
　　second access information of the second command;
　identifying, from the first and second command sequence numbers, an invoking sequence of the first command and the second command;
　detecting, based upon the first and second access information, an execution conflict between the first command and the second command; and
　saving, in a re-execution list and based upon the execution conflict, the first and second commands, wherein
the command sequence numbers specify an execution sequence of the commands in serial execution.

16. The computer program product of claim 15, wherein
the command sequence numbers are stored within a makefile.

17. The computer program product of claim 15, wherein
the access information for a particular command includes an access type, and
the conflict is detected based upon the access type for the particular command being a write operation.

18. The computer program product of claim 15, wherein
the first and second access information respectively include first and second access timestamps, and
the conflict is detected based the execution sequence being inconsistent with a time sequence of the first and second access timestamps.

19. The computer program product of claim 15, wherein
the access information for a particular command includes an accessed file ID, and
the conflict is detected based upon the first and second access information referring to a same particular access file ID.

20. The computer program product of claim 15, wherein
the first and second command sequence numbers are also saved in the re-execution list.

* * * * *